(12) United States Patent
Nagai et al.

(10) Patent No.: US 7,561,847 B2
(45) Date of Patent: Jul. 14, 2009

(54) RADIO APPARATUS, RADIO COMMUNICATION SYSTEM, SPATIAL PATH CONTROL METHOD, AND SPATIAL PATH CONTROL PROGRAM

(75) Inventors: Makoto Nagai, Kakamigahara (JP); Yoshiharu Doi, Gifu (JP)

(73) Assignee: Sanyo Electric Co., Ltd., Osaka (JP)

( * ) Notice: Subject to any disclaimer, the term of this patent is extended or adjusted under 35 U.S.C. 154(b) by 461 days.

(21) Appl. No.: 10/504,919

(22) PCT Filed: Feb. 12, 2003

(86) PCT No.: PCT/JP03/01454

§ 371 (c)(1),
(2), (4) Date: Aug. 18, 2004

(87) PCT Pub. No.: WO03/071714

PCT Pub. Date: Aug. 28, 2003

(65) Prior Publication Data

US 2005/0148301 A1   Jul. 7, 2005

(30) Foreign Application Priority Data

Feb. 20, 2002  (JP) .............................. 2002-043320

(51) Int. Cl.
H04B 1/00 (2006.01)
H04B 15/00 (2006.01)
H04B 1/10 (2006.01)

(52) U.S. Cl. .................... 455/65; 455/67.13; 455/562.1; 455/575.7

(58) Field of Classification Search .................... 455/65, 455/67.13, 517, 562.1, 575.7; 342/368
See application file for complete search history.

(56) References Cited

U.S. PATENT DOCUMENTS 5,909,649 A   6/1999   Saunders (Continued)

FOREIGN PATENT DOCUMENTS

CN   1164170   11/1997

(Continued)

OTHER PUBLICATIONS

Shigeru Tomisato et al.; "Radio Signal Processing for Mobile MIMO Signal Transmission"; *Technical Report of IEICE:* A-P2001-97, RCS2001-136; pp. 43-48, c. 2001.

(Continued)

*Primary Examiner*—Nay A Maung
*Assistant Examiner*—Tuan H Nguyen
(74) *Attorney, Agent, or Firm*—McDermott Will & Emery LLP

(57) ABSTRACT

In an MIMO mobile communication system allowing a PDMA base station to communicate with a single terminal through a plurality of paths the terminal and the base station are each responsive to information of communication quality of a spatial path detected as having a reception error to appropriately control switching the path's communication operation between a plurality of types of operations. In a first operation, only a single path remains and the other paths are disconnected. In a second operation, path diversity is effected. In a third operation, path's modulation level is reduced. These operations are performed by a DSP. If in the MIMO system paths' mutual interference occurs the terminal and base station can still maintain connection.

16 Claims, 9 Drawing Sheets

U.S. PATENT DOCUMENTS

| | | | |
|---|---|---|---|
| 6,021,123 A * | 2/2000 | Mimura | 370/331 |
| 6,456,598 B1 * | 9/2002 | Le Strat et al. | 370/252 |
| 6,791,967 B1 * | 9/2004 | Ishida | 370/345 |
| 6,912,259 B1 * | 6/2005 | Tsumura | 375/354 |
| 7,024,163 B1 * | 4/2006 | Barratt et al. | 455/69 |
| 2004/0196876 A1 * | 10/2004 | Katagiri et al. | 372/23 |
| 2006/0121946 A1 * | 6/2006 | Walton et al. | 455/561 |

FOREIGN PATENT DOCUMENTS

| | | |
|---|---|---|
| CN | 1298268 | 6/2001 |
| EP | 1 026 835 A2 | 8/2000 |
| EP | 1 206 051 A1 | 5/2002 |
| JP | 09-187055 | 7/1997 |
| JP | 11-032030 | 2/1999 |
| JP | 2000-183795 | 6/2000 |
| JP | 2002-026790 | 1/2002 |

OTHER PUBLICATIONS

Toshihiko Nishimura et al.; "SDMA Downlink Beaforming for a MIMO Channel"; *Technical Report of IEICE*: A-P2001-116, RCS2001-155; pp. 23-30, c. 2001.

Nobuyoshi Kikuma; "Adaptive Signal Processing by Array Antenna"; *Kagaku Gijutsu Shuppan*; pp. 35-49, c. 1998.

\* cited by examiner

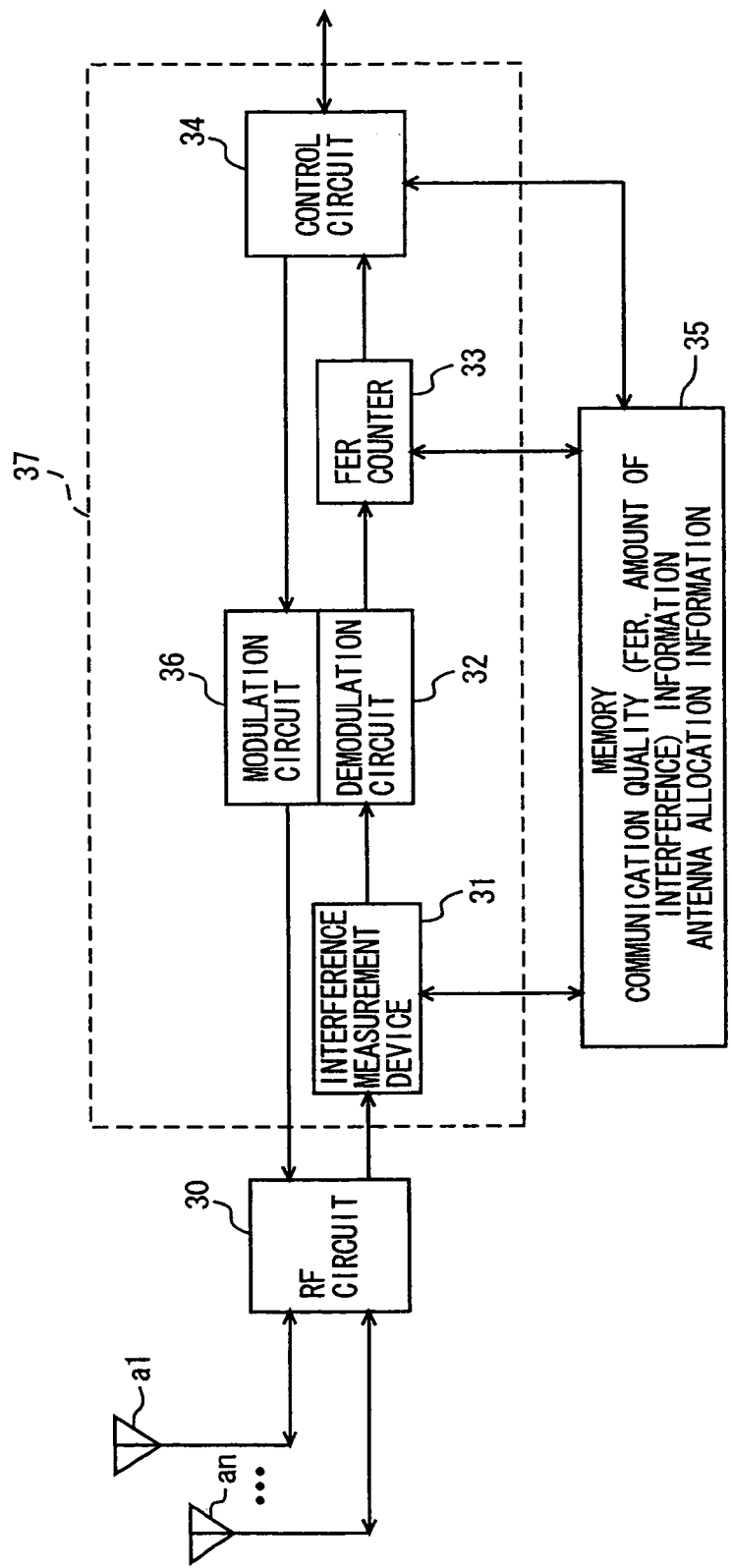
F I G. 2

F I G. 3
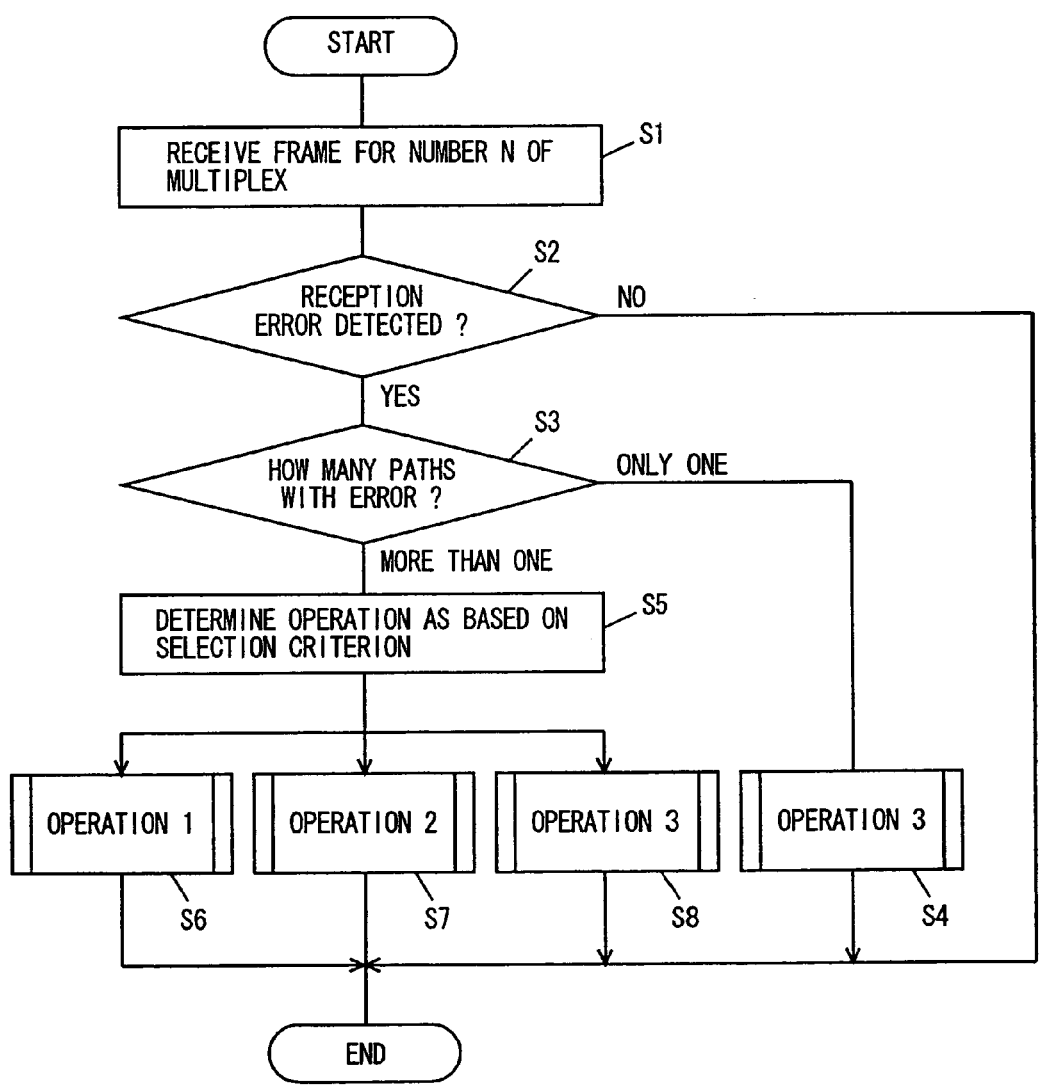

RADIO APPARATUS, RADIO COMMUNICATION SYSTEM, SPATIAL PATH CONTROL METHOD, AND SPATIAL PATH CONTROL PROGRAM

TECHNICAL FIELD

The present invention relates generally to radio apparatuses, radio communication systems, methods of controlling a spatial path and programs for controlling a spatial path, and in particular to radio apparatuses, radio communication systems, methods of controlling a spatial path and a program for controlling a spatial path that allow multiplex communication between a single radio terminal and a radio base station via a plurality of paths formed by space division.

BACKGROUND ART

In recent years in rapidly developing mobile communication systems (e.g., personal handyphone system (PHS)) a system referred to as path division multiple access (PDMA) has been proposed. This system can establish spatial multiple access from multiple users' mobile radio terminal devices (terminals) to a radio base station (a base station) via a plurality of paths formed by spatially dividing a single time slot of a single frequency to more efficiently use a frequency of an electric wave.

This PDMA system currently adopts adaptive array technology. Adaptive array processing is performed to calculate from a signal received from a terminal a weight vector formed of reception coefficients (weights) for respective antennas of a base station for adaptive control to accurately extract a signal from a desired terminal.

Such adaptive array processing allows an uplink signal from an antenna of each user terminal to be received by an array antenna of a base station and then isolated and extracted with reception directivity, and a downlink signal from the base station to the terminal to be transmitted from the array antenna with transmission directivity to the antenna of the terminal.

Such adaptive array processing is a well-known technique, and described in detail, for example, in Nobuyoshi Kikuma, "Adaptive Signal Processing by Array Antenna," Kagaku Gijutsu Shuppan, pp.35-49, "Chapter 3: MMSE Adaptive Array." Therefore, its operation's principle will not be described.

FIG. 8A is a conceptual view schematically illustrating an example in which a single terminal 2 with a single antenna is connected to a PDMA base station 1 via one of a plurality of paths formed by space division in a PDMA mobile communication system (PHS).

More specifically, PDMA base station 1 receives with an array antenna 1a an uplink signal from a single antenna 2a of terminal 2, and the signal is isolated and extracted with reception directivity through the above-described adaptive array processing. On the other hand, array antenna 1a of PDMA base station 1 transmits a downlink signal with transmission directivity to antenna 2a of terminal 2. Terminal 2 receives the downlink signal with antenna 2a without adaptive array processing.

FIG. 8B is timing plots schematically showing a manner of channel allocation in this example. In the example of FIG. 8B, users 1 to 4 are time division multiplexed at respective time slots obtained by division in a direction of time base at a single frequency. Here, for each slot one user is allocated via a single path, as seen in a spatial direction.

In contrast, a Multi Input Multi Output (MIMO) system has been proposed, in which multiplex communication is established between a single terminal having a plurality of antennas and a PDMA base station via a plurality of spatial paths of a single identical frequency and a single time slot.

Such MIMO communication technology is described in detail, for example, in Nishimura et al., "SDMA Downlink Beamforming for a MIMO Channel," Technical Report of IEICE, A-P2001-116, RCS2001-155, pp.23-30, October 2001, and in Tomisato et al, "Radio Signal Processing for Mobile MIMO Signal Transmission," Technical Report of IEICE, A-P2001-97, RCS2001-136, pp.43-48, October 2001.

FIG. 9A is a conceptual view schematically illustrating an example in which a single terminal 12 with four antennas establishes spatial multiple connection to a PDMA base station 11 via a plurality of paths (e.g. four paths) formed by space division in such a MIMO mobile communication system (PHS).

More specifically, PDMA base station 11 receives with an array antenna 11a uplink signals from respective four antennas 12a-12d of terminal 12, and the signals are isolated and extracted with reception directivity through the above-described adaptive array processing. On the other hand, array antenna 11a of PDMA base station 11 transmits downlink signals with transmission directivity to respective four antennas 12a-12d of terminal 12. Terminal 12 receives corresponding downlink signals with its respective antennas without adaptive array processing.

FIG. 9B is timing plots schematically showing a manner of channel allocation in this example. In the example of FIG. 9B, users 1 to 4 are time division multiplexed at respective time slots obtained by division in a direction of timebase at a single frequency. For each slot, as seen in a spatial direction, a single user is multiplexed for allocation via four paths.

For example, noting a first time slot in FIG. 9B, user 1 is allocated to all of the channels via four spatial paths. Then, a signal of user 1 is divided and transmitted between the terminal and the base station via four paths of the same slot, and the divided signals are reconfigured at a recipient. A four-paths-for-one-user scheme as shown in FIG. 9B can provide a four fold increase in communication rate, as compared with a one-path-for-one-user scheme in FIG. 8B.

Here, some of the plurality of spatial paths of the same slot in the PDMA system may be used to establish communication in multiple-paths-for-one-user scheme as shown in FIGS. 9A and 9B and the remaining paths may be used to establish communication in a one-path-for-one-user scheme as shown in FIGS. 8A and 8B.

A specific method of transmission/reception of a signal in the MIMO system as shown in FIGS. 9A and 9B is disclosed in detail in Japanese Patent Laying-Open No. 11-32030, for example.

For the PDMA system based on a conventional, one user for one path scheme as shown in FIGS. 8A and 8B, there is not the concept of multiplexing at a terminal. As such, paths would not cause interference for a single user terminal.

The MIMO system shown in FIGS. 9A and 9B, by contrast, adopts a multiple paths for one user scheme in a single time slot allowing a terminal to have a multiplex function. As such, signal interference is caused among paths for the user and by extension the possibility that the connection between the terminal and the base station may be lost is increased.

In other words, as eliminating interference itself is basically difficult, it has been a significant issue in MIMO mobile communication systems when interference is caused among paths and the connection between a terminal and a base station is apt to be lost how the connection can be maintained.

Therefore the present invention contemplates a radio apparatus, a radio communication system, a method of controlling a spatial path and a program for controlling a spatial path in a mobile communication system employing a multiple paths for one user scheme such as the MIMO system for communication, capable of preventing a terminal and a base station from losing connection therebetween despite signal interference among paths to maintain communication.

DISCLOSURE OF THE INVENTION

The present invention in one aspect provides a radio apparatus capable of forming a plurality of spatial paths to/from a separate single radio apparatus for communication, including reception error detection means and operation select means. The reception error detection means detects a reception error being introduced in the plurality of spatial paths. The operation select means is responsive to information of communication quality of a spatial path detected as having a reception error to select a communication operation for the spatial path detected as having the reception error.

Preferably when there are more than one spatial path detected as having the reception error the operation select means selects an operation releasing more than one spatial path excluding one spatial path.

Preferably the operation select means selects an adaptive array reception operation utilizing the spatial path released.

Preferably when there are more than one spatial path detected as having the reception error the operation select means selects an operation transmitting identical information through more than one spatial path.

Preferably when the reception error is detected in a spatial path capable of accommodating a plurality of modulation systems the operation select means selects an operation changing a modulation system.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in another aspect provides a radio apparatus capable of forming a plurality of spatial paths to/from a separate single radio apparatus for communication, including reception error detection means and operation select means. The reception error detection means detects a reception error being introduced in the plurality of spatial paths. The operation select means is responsive to a number of spatial paths detected as having the reception error and information of communication quality of the path detected as having the reception error to select one of a first operation releasing a plurality of spatial paths detected as having the reception error excluding one spatial path, a second operation transmitting identical information through a plurality of spatial paths detected as having the reception error, and a third operation changing a modulation system of a spatial path detected as having the reception error.

Preferably when the reception error is detected in a spatial path capable of accommodating a plurality of modulation systems the operation select means selects the third operation.

Preferably when a plurality of spatial paths detected as having the reception error have a reception error rate exceeding a prescribed threshold value the operation select means selects one of the first and second operations.

Preferably when a plurality of spatial paths detected as having the reception error have an amount of interference exceeding a prescribed threshold value the operation select means selects one of the first and second operations.

Preferably when the operation select means selects the first operation the operation select means selects an adaptive array reception operation utilizing the spatial path released.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a radio communication system capable of forming a plurality of spatial paths between a first radio apparatus and a second radio apparatus for communication, the first and second radio apparatuses each including reception error detection means and operation select means. The reception error detection means detects a reception error being introduced in the plurality of spatial paths. The operation select means is responsive to information of communication quality of a spatial path detected as having a reception error to select a communication operation for the spatial path detected as having the reception error.

Preferably when there are more than one spatial path detected as having the reception error the operation select means selects an operation releasing more than one spatial path excluding one spatial path.

Preferably when there are more than one spatial path detected as having the reception error the operation select means selects an operation transmitting identical information through more than one spatial path.

Preferably when the reception error is detected in a spatial path capable of accommodating a plurality of modulation systems the operation select means selects an operation changing a modulation system.

Preferably one of first and second radio apparatuses is a radio apparatus in a base station of a mobile communication system and the other is a radio apparatus in a mobile terminal device of the mobile communication system.

Preferably the base station is an adaptive array base station forming the plurality of spatial paths.

The present invention in still another aspect provides a method of controlling a spatial path, employed in a radio apparatus capable of forming a plurality of spatial paths to/from a separate single radio apparatus for communication, including the steps of: detecting a reception error being introduced in the plurality of spatial paths; and selecting a communication operation for a spatial path detected as having the reception error, based on information of communication quality of the spatial path detected as having the reception error.

Preferably when there are more than one spatial path detected as having the reception error the step of selecting selects an operation releasing more than one spatial path excluding one spatial path.

Preferably the step of selecting selects an adaptive array reception operation utilizing the spatial path released.

Preferably when there are more than one spatial path detected as having the reception error the step of selecting selects an operation transmitting identical information through more than one spatial path.

Preferably when the reception error is detected in a spatial path capable of accommodating a plurality of modulation systems the step of-selecting selects an operation changing a modulation system.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a method of controlling a spatial path, employed in a radio apparatus capable of forming a plurality of spatial paths to/from a separate single radio apparatus for communication, including the steps of: detecting a reception error being introduced in the plurality of spatial paths; and selecting one of first, second and third operations based on a number of spatial paths detected as having the reception error and information of communication quality of the path detected as having the reception error, the first operation releasing a plurality of spatial paths detected as having the reception error excluding one spatial path, the second operation transmitting identical information through a plurality of spatial paths detected as having the reception error, the third operation changing a modulation system of a spatial path detected as having the reception error.

Preferably when the reception error is detected in a spatial path capable of accommodating a plurality of modulation systems the step of selecting selects the third operation.

Preferably when there are a plurality of spatial paths detected as having the reception error have a reception error rate exceeding a prescribed threshold value the step of selecting selects one of the first and second operations.

Preferably when a plurality of spatial paths detected as having the reception error have an amount of interference exceeding a prescribed threshold value the step of selecting selects one of the first and second operations.

Preferably when the operation select means selects the first operation the step of selecting selects an adaptive array reception operation utilizing the spatial path released.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a program for controlling a spatial path, employed in a radio apparatus capable of forming a plurality of spatial paths to/from a separate single radio apparatus for communication the program causing a computer to execute the steps of: detecting a reception error being introduced in the plurality of spatial paths; and selecting a communication operation for a spatial path detected as having the reception error, based on information of communication quality of the spatial path detected as having the reception error.

Preferably when there are more than one spatial path detected as having the reception error the step of selecting selects an operation releasing more than one spatial path excluding one spatial path.

Preferably the step of selecting selects an adaptive array reception operation utilizing the spatial path released.

Preferably when there are more than one spatial path detected as having the reception error the step of selecting selects an operation transmitting identical information through more than one spatial path.

Preferably when the reception error is detected in a spatial path capable of accommodating a plurality of modulation systems the step of selecting selects an operation changing a modulation system.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

The present invention in still another aspect provides a program for controlling a spatial path, employed in a radio apparatus capable of forming a plurality of spatial paths to/from a separate single radio apparatus for communication, the program causing a computer to execute the steps of: detecting a reception error being introduced in the plurality of spatial paths; and selecting one of first, second and third operations as based on a number of spatial paths detected as having the reception error and information of communication quality of the path detected as having the reception error, the first operation releasing a plurality of spatial paths detected as having the reception error excluding one spatial path, the second operation transmitting identical information through a plurality of spatial paths detected as having the reception error, the third operation changing a modulation system of a spatial path detected as having the reception error.

Preferably when the reception error is detected in a spatial path capable of accommodating a plurality of modulation systems the step of selecting selects the third operation.

Preferably when a plurality of spatial paths detected as having the reception error have a reception error rate exceeding a prescribed threshold value the step of selecting selects one of the first and second operations.

Preferably when a plurality of spatial paths detected as having the reception error have an amount of interference exceeding a prescribed threshold value the step of selecting selects one of the first and second operations.

Preferably when the operation select means selects the first operation the step of selecting selects an adaptive array reception operation utilizing the spatial path released.

Preferably the radio apparatus is a radio apparatus in a base station of a mobile communication system and the separate single radio apparatus is a radio apparatus in a mobile terminal device of the mobile communication system.

Preferably the radio apparatus is a radio apparatus in a mobile terminal device of a mobile communication system and the separate single radio apparatus is a radio apparatus in a base station of the mobile communication system.

Preferably the base station is an adaptive array base station forming the plurality of spatial paths.

Thus in accordance with the present invention in an MIMO mobile communication system's terminal or base station a communication operation through a spatial path detected as having a reception error can appropriately be switched to a more reliable method of communication based on the path's communication quality information. If spatial paths interfere each other, the terminal and the base station can still maintain connection therebetween to achieve an increased probability of maintaining communication.

BRIEF DESCRIPTION OF THE DRAWINGS

In the drawings:

FIG. 2 is a functional block diagram showing a configuration of a terminal accommodating the MIMO system in an embodiment of the present invention;

FIG. 3 is a flow chart for illustrating an operation of a terminal accommodating the MIMO system in an embodiment of the present invention;

BEST MODES FOR CARRYING OUT THE INVENTION

Hereinafter the present invention in embodiment will be described more specifically with reference to the drawings. Throughout the figures, like portions are identically denoted.

Figure 1:
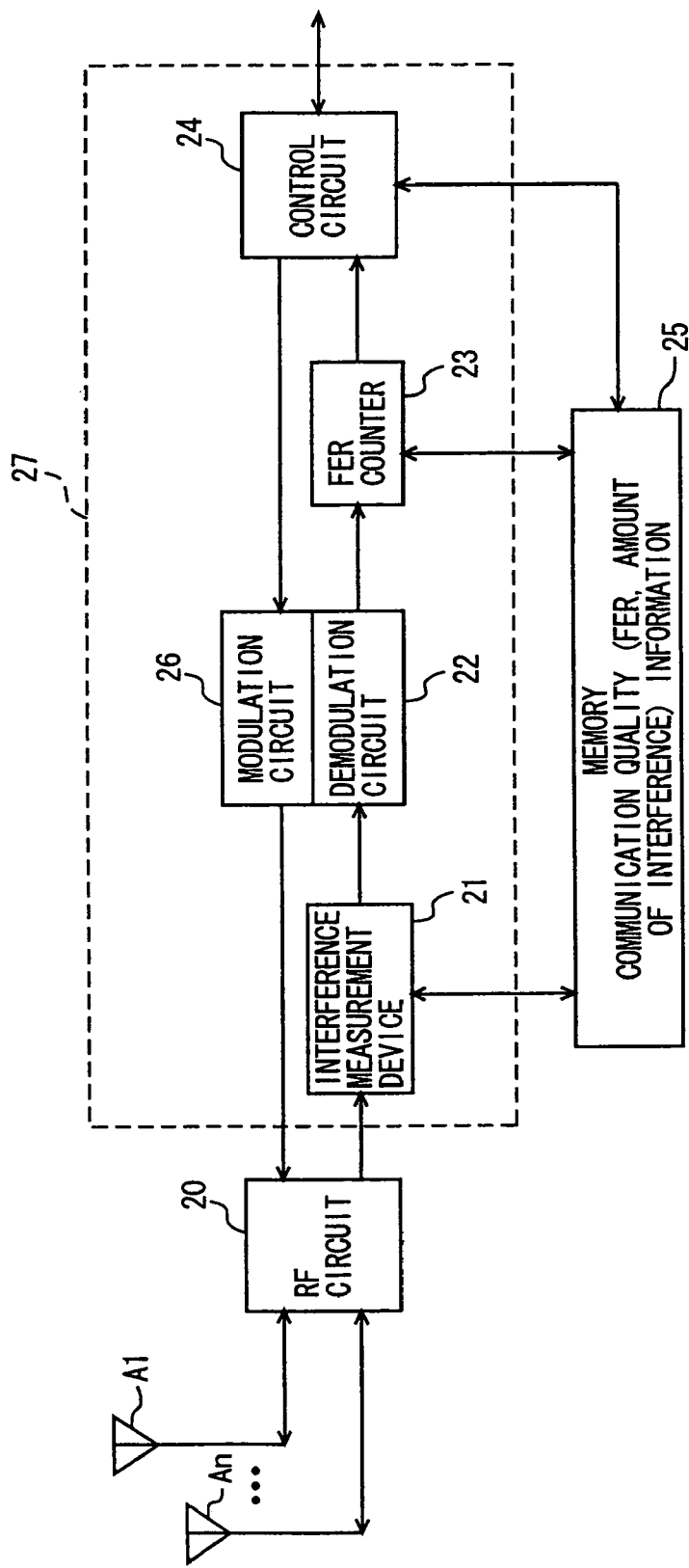
FIG. 1 is a functional block diagram showing a configuration of a PDMA base station in an embodiment of the present invention.

FIG. 1 is a functional block diagram showing a configuration of a PDMA base station accommodating an MIMO system in an embodiment of the present invention. With reference to FIG. 1, an array antenna formed of n antennas A1-An receives an electric wave of a signal from a terminal (not shown) through a plurality of spatial paths. The signal is subjected by an RF circuit 20 to amplification, conversion in frequency and other similar, prescribed signal process, and then provided as a received signal to a digital signal processor (DSP) 27.

In the configuration of the PDMA base station shown in the functional block diagram of FIG. 1 an interference measurement device 21, a demodulation circuit 22, an FER counter 23, a control circuit 24 and a modulation circuit 26 have their functions implemented by the base station's DSP 27 by software.

Interference measurement device 21 measures for each path an amount of interference caused in an uplink received signal and stores the measured amount of interference to a memory 25 as an element of communication quality information for evaluation of communication quality.

Interference measurement device 21 measures an interference component contained in a complex reception signal input to a subsequent, demodulation circuit 22. It may be measured, as follows: if the complex reception signal is represented by y(t), an error component e(t) between y(t) and a reference signal d(t) stored in memory 25 is calculated, and the error's power is regarded as an interference signal's power. Here, the interference signal's power is expressed in the following equations:

$$e(t)=y(t)-d(t)$$

$$\text{interference power}=\Sigma|e(t)|/T$$

where T represents observation time (or the reference signal's length).

The received signal having its amount of interference measured by interference measurement circuit 21 is received by demodulation circuit 22 and demodulated as prescribed. The demodulated signal is output to FER counter 23 detecting a frame error rate (FER).

FER counter 23 counts the number of errors in a signal frame for each path. A resultant FER is stored to memory 25 as one element of communication quality information for evaluation of communication quality.

The demodulated signal the errors of which are counted by FER counter 23 is output to control unit 24. Control unit 24 communicates with memory 25, refers to uplink signal's communication quality information such as an FER, an amount of interference and the like held in memory 25, and controls a downlink spatial path by a method of controlling a spatial path in accordance with the present invention described later. Note that this PDMA base station performs a well known adaptive array processing, which is performed by DSP 27 by software, although for the sake of diagrammatic representation, it is performed by control circuit 24 for the sake of illustration.

Control circuit 24 outputs a demodulated signal which is in turn received by a modem (not shown).

The modem (not shown) passes a transmission signal which is in turn passed through control circuit 24 to modulation circuit 26 and modulated therein as prescribed and then output to RF circuit 20.

RF circuit 20 subjects each path's signal to a well known transmission process and transmits the signal through antennas A1 -An with transmission directivity to an antenna of a corresponding terminal.

FIG. 2 is a functional block diagram showing a configuration of a user terminal accommodating the MIMO system in an embodiment of the present invention. With reference to FIG. 2, from a PDMA base station (not shown) through n spatial paths n antennas a1-an each receive an electric wave of a signal. The signal is subjected by an RF circuit 30 to amplification, conversion in frequency, and other similar, prescribed signal process, and then fed as a received signal to a DSP 37.

In the configuration of the terminal shown in the functional block diagram of FIG. 2 an interference measurement device 31, a demodulation circuit 32, an FER counter 33, a control circuit 34 and a modulation circuit 36 have their functions implemented by the terminal's DSP 37 by software.

Interference measurement device 31 measures for each path an amount of interference caused in a downlink received signal and stores the measured amount of interference to a memory 35 as an element of communication quality information for evaluation of communication quality. Interference measurement device 31 measures an amount of interference, as described in connection with interference measurement device 21 shown in FIG. 1.

The received signal having its amount of interference measured by interference measurement circuit 31 is received by demodulation circuit 32 and demodulated as prescribed. The demodulated signal is output to FER counter 33 detecting an FER.

FER counter 33 counts the number of errors in a signal frame for each path. A resultant FER is stored to memory 35 as one element of communication quality information for evaluation of communication quality.

The demodulated signal the errors of which are counted by FER counter 23 is output to control unit 34. Control unit 34 communicates with memory 35, refers to downlink signal's communication quality information such as an FER, an amount of interference and the like and antenna allocation information held in memory 35, and controls an uplink spatial path by the method of controlling a spatial path in accordance with the present invention described later.

Note that while this terminal normally does not perform adaptive array reception, it can do so, as will be described hereinafter, using more than one of n antennas, as based on antenna allocation information stored in memory 35. In that case, it performs a well known adaptive array processing, which is performed by DSP 37 by software, although for the sake of diagrammatic representation, it is performed by control circuit 34 for the sake of illustration.

Control circuit 34 outputs a demodulated signal which is in turn received by a modem (not shown).

The modem (not shown) passes a transmission signal which is in turn passed through control circuit 34 to modulation circuit 36 and modulated therein as prescribed and then output to RF circuit 30.

RF circuit 30 subjects each path's signal to a well known transmission process and transmits the signal via antennas a1-an through corresponding spatial paths to a PDMA base station.

FIG. 3 is a flow chart for illustrating the basic operation of the user terminal accommodating MIMO according to the embodiment of the present invention shown in FIG. 2, i.e., the terminal's operation performed when a downlink reception error is introduced in a spatial path. The FIG. 3 operation is performed by the FIG. 2 terminal's DSP 37 by software.

Note that in this example the MIMO terminal uses N antennas to establish multiple connection through n spatial paths to a PDMA base station (a number N of multiplexing).

Initially at step (S)1 the terminal receives a downlink signal from a base station for N frames corresponding to number N of multiplexing.

Then at S2 whether there is any reception error in received signal of N frames received through the N spatial paths is detected. If no reception error is detected, the process ends. If there is any reception error detected, S3 is performed to detect the number of spatial paths detected as having a reception error.

At S3 when a decision is made that a reception error is found in a single spatial path then S4 is performed to perform a third operation changing the modulation system of the spatial path detected as having the reception error to reduce the path's modulation level. The third operation will be described more specifically hereinafter.

If at S3 a decision is made that a reception error is found in more than one spatial path then S5 is performed to compare information of communication quality of the spatial paths detected as having the reception error with a prescribed selection criterion to determine the paths' operation.

More specifically at S5 which one of S6-S8, or first to third operations should be performed is determined.

The first operation at S6 maintains only one (e.g., Mth) path of a plurality of spatial paths detected as having a reception error and releases the other path(s) (or disconnects its or their connection to the base station).

The second operation at S7 allows a plurality of spatial paths detected as having a reception error to transmit identical uplink signals (path diversity operation). The first and second operations will be described hereinafter more specifically.

The third operation at S8 is identical to the S4 third operation.

Before the first to third operations are described in detail, how in S5 an operation is determined will now be described with reference to a specific example. As has been described previously, at S5 information of communication quality of a spatial path with a reception error is compared with a prescribed selection criterion to determine the path's operation. The information of communication quality of a spatial path can be a variety of factors such as the path's reception error rate, reception level degradation, amount of interference, modulation level of the modulation system adopted.

At S5 an operation can be determined (or selected) in a first example as based on communication quality information of whether a spatial path with a reception error accommodates a plurality of modulation systems, i.e., the terminal and the base station both accommodate the plurality of modulation systems.

More specifically, if they accommodate a plurality of modulation systems the S8 third operation (changing a modulation system) is selected, otherwise first operation at S6 (releasing paths excluding one path) or the second operation at S7 (the path diversity operation) is selected.

At S5 an operation can be determined (or selected) in a second example as based on communication quality information of whether a spatial path with a reception error has a reception error rate exceeding a prescribed threshold value.

More specifically, if the reception error rate exceeds the prescribed threshold value then the first operation at S6 (releasing paths excluding one path) or the second operation at S7 (the path diversity operation) is selected, otherwise the S8 third operation (changing a modulation system) is selected if the spatial path is capable of accommodating a plurality of modulation systems.

At S5 an operation can be determined (or selected) in a third example as based on communication quality information of whether a spatial path with a reception error provides an amount of interference, as measured, exceeding a prescribed threshold value.

More specifically, if the amount of interference exceeds the prescribed threshold value then the first operation at S6 (releasing paths excluding one path) or the second operation at S7 (the path diversity operation) is selected, otherwise the S8 third operation (changing a modulation system) is selected if the spatial path is capable of accommodating a plurality of modulation systems.

Figure 4:
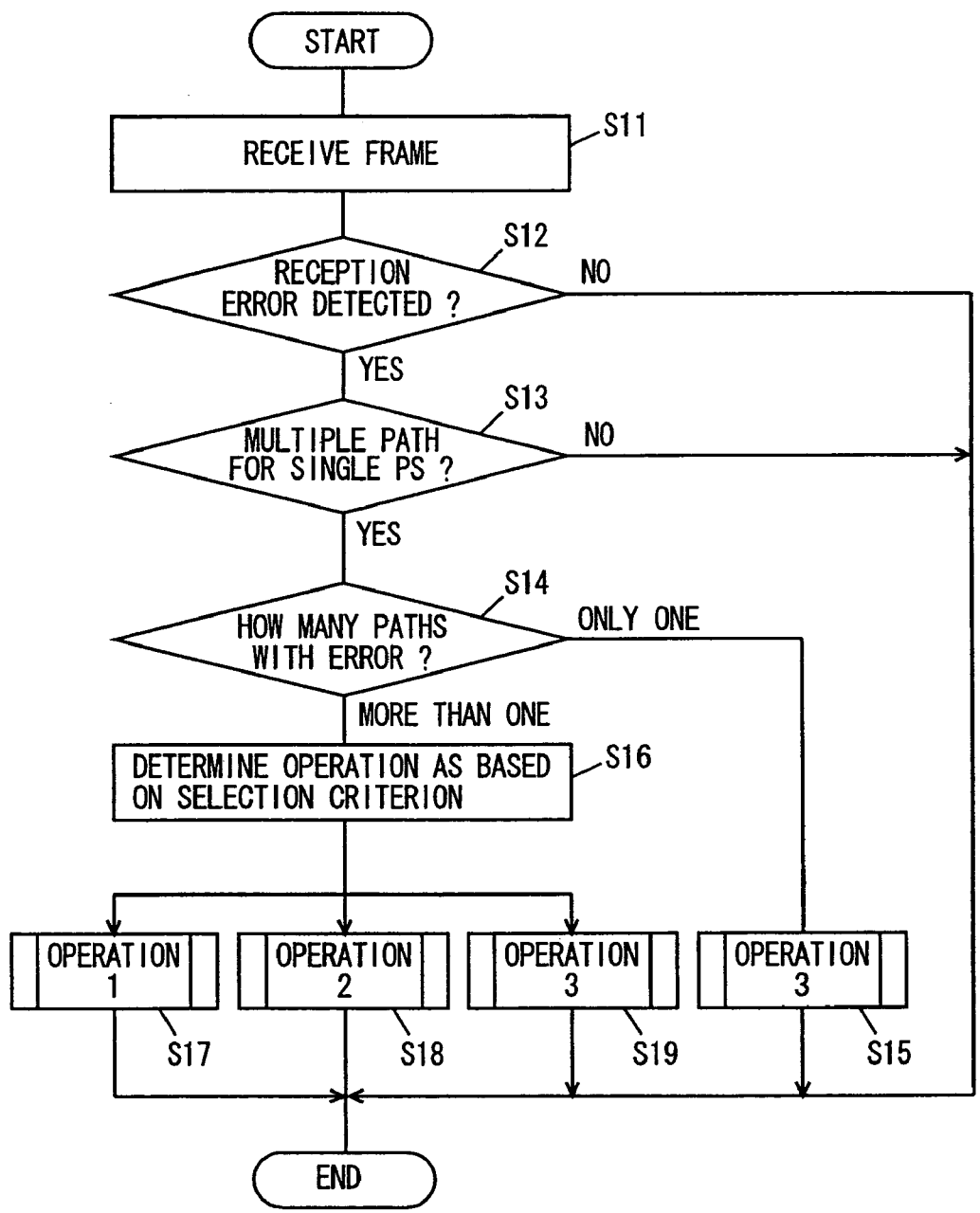
FIG. 4 is a flow chart for illustrating an operation of a PDMA base station in an embodiment of the present invention.

FIG. 4 is a flow chart for illustrating the basic operation of the PDMA base station accommodating MIMO according to the embodiment of the present invention shown in FIG. 1, i.e., the basic operation performed when an uplink reception error is introduced in a spatial path. The FIG. 4 operation is performed by the FIG. 1 base station's DSP 27 by software.

In this example, an MIMO terminal also uses N antennas to have multiple connection through N spatial paths to the PDMA base station (a number N of multiplexing).

Initially at S11 the PDMA base station receives an uplink signal frame from an MIMO user terminal through adaptive array processing.

Then at S12 whether there is any reception error caused in a signal received through N spatial paths is detected. If there is any reception error detected, the process ends. If there is not any reception error detected, S13 is performed to determine if a plurality of spatial paths establish connection to a single counterpart terminal. If not the process ends. If N spatial paths establish connection to a single terminal by multiple connection then S14 is performed to detect the number of spatial paths with a reception error.

At S14 if a decision is made that a reception error is found in a single spatial path then S15 is performed to effect the third operation as described above to change the single path's modulation system to reduce the path's modulation level. The third operation will be described hereinafter more specifically.

If at S14 a decision is made that a reception error is found in more than one spatial path then S16 is performed to compare information of communication quality of the spatial paths with a prescribed selection criterion to determine the paths' operation.

More specifically, at S16, which one of the first operation at S17, or the second operation at S18 or the third operation at S19 should be performed is determined.

The first operation at S17 maintains only one (e.g., Mth) path of a plurality of spatial paths with a reception error and releases the other path(s) (or disconnects its or their connection to the terminal), as has been described previously.

The second operation at S18 allows a plurality of spatial paths with a reception error to transmit identical uplink signals (the path diversity operation), as has been described previously. The first and second operations will be described hereinafter more specifically.

The S19 third operation is identical to the S15 third operation.

At S16 an operation is determined as has been described in conjunction with the FIG. 3 terminal's operation at S5 by the first to third examples.

Figure 5:
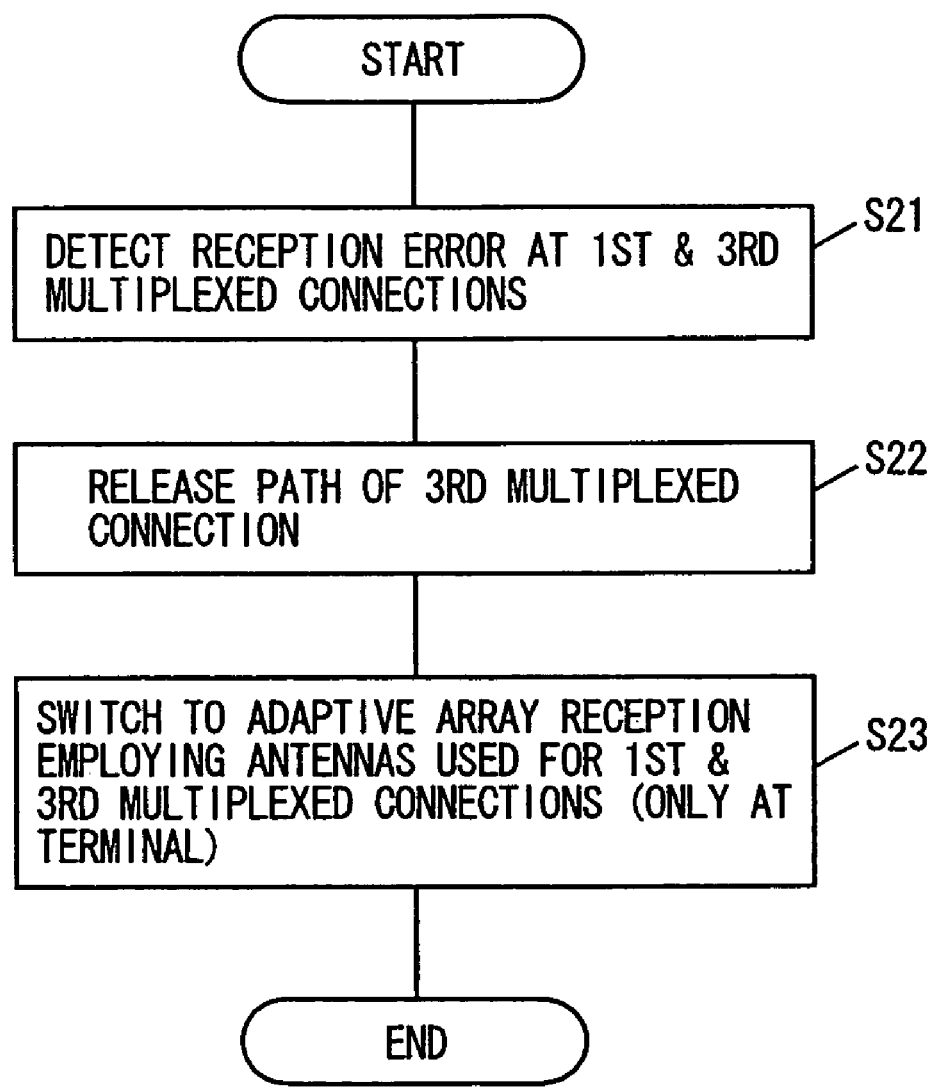
FIG. 5 is a flow chart specifically illustrating a first operation for controlling a spatial path in an embodiment of the present invention.

In the FIG. 3 S6 and the FIG. 4 S17 the first operation is performed, as will be described more specifically hereinafter. FIG. 5 is a flow chart representing the first operation. As has been described previously, the first operation allows the terminal or the base station to operate to maintain only one (e.g., Mth) path of a plurality of paths with a reception error while releasing the other path(s) (or disconnecting its or their connection between the terminal and the base station).

For example let us assume that between the terminal and the base station the number of the multiplexed connections is four and the spatial paths of the first and third multiplexed connections are detected as having a reception error.

In that case, in FIG. 5 at S21 a reception error being introduced in the spatial paths of the first and third multiplexed connections is detected.

In that case S22 is performed to release (or disconnect) the third multiplexed connection while maintaining the first multiplexed connection. Consequently, communication provided through four multiplexed connections will be provided through three multiplexed connections, resulting in a reduced communication rate. For example, communication through four multiplexed connections at a rate of 128 Kbps would be made through three multiplexed connections at a rate of 96 Kbps, i.e., ¾ of the rate for the four multiplexed connections.

If the spatial paths of the first and third multiplexed connections interfere each other and a reception error is introduced, however, one of them can be disconnected to prevent the spatial paths of the first and third multiplexed connections from both failing and at least one of the spatial paths can be maintained for communication.

Note that if an MIMO terminal performs the first operation, performing S23 to allow the terminal to perform adaptive array reception using an antenna used for the first multiplexed connection as well as that used for the third multiplexed connection released allows the downlink signal of the first multiplexed connection to be better received and the signal communication of the first multiplexed connection to be maintained with a higher probability. Note that to perform such adaptive array reception, antennas are allocated as based on antenna allocation information stored in memory 35 of the FIG. 2 terminal.

Figure 6:
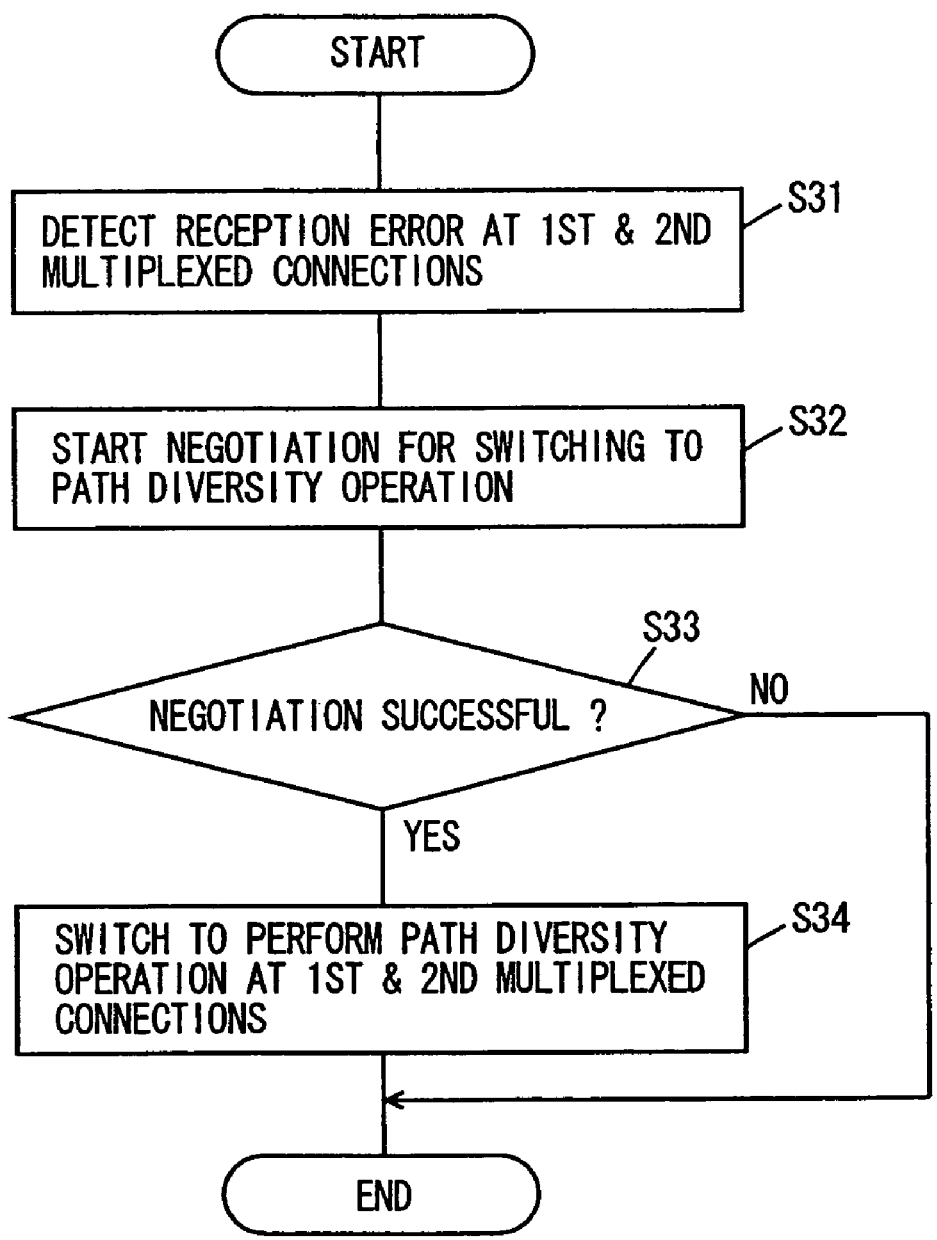
FIG. 6 is a flow chart specifically illustrating a second operation for controlling a spatial path in an embodiment of the present invention.

In the FIG. 3 S7 and the FIG. 4 S18 the second operation is performed as will be described hereinafter more specifically. FIG. 6 is a flow chart for illustrating the second operation. As has been described previously, the second operation allows the terminal or the base station to operate to allow a plurality of spatial paths with a reception error to transmit a single signal (a path diversity operation). For example, let us assume that between the terminal and the base station the number of the multiplexed connections is four and the spatial paths of the first and second multiplexed connections are detected as having a reception error.

In that case, in the FIG. 6 S31 a reception error being introduced in the spatial paths of the first and second multiplexed connections is detected.

In that case S32 is performed and for a downlink reception error detected at the terminal the terminal starts a negotiation with the base station for switching to a path diversity operation at the first and second multiplexed connections and for an uplink reception error detected at the base station the base station starts a negotiation with the terminal for switching to the path diversity operation at the first and second multiplexed connections.

If a decision is made at S33 that the negotiation has failed, the current operation ends. If a decision is made that the negotiation is successful then S34 is performed to perform the path diversity operation to allow the first and second multiplexed connections to transmit identical signals. Consequently, the path diversity operation provides communication at a rate reduced to ¾ of that at which four multiplexed connections are allowed to transmit different signals, respectively.

At the recipient, however, of the identical signals of the first and second multiplexed connections the signal of a spatial path free of reception error can be selected or the both signals can be composited together to obtain a gain to achieve an increased probability of reception and hence an increased probability with which communication can be maintained.

Figure 7:
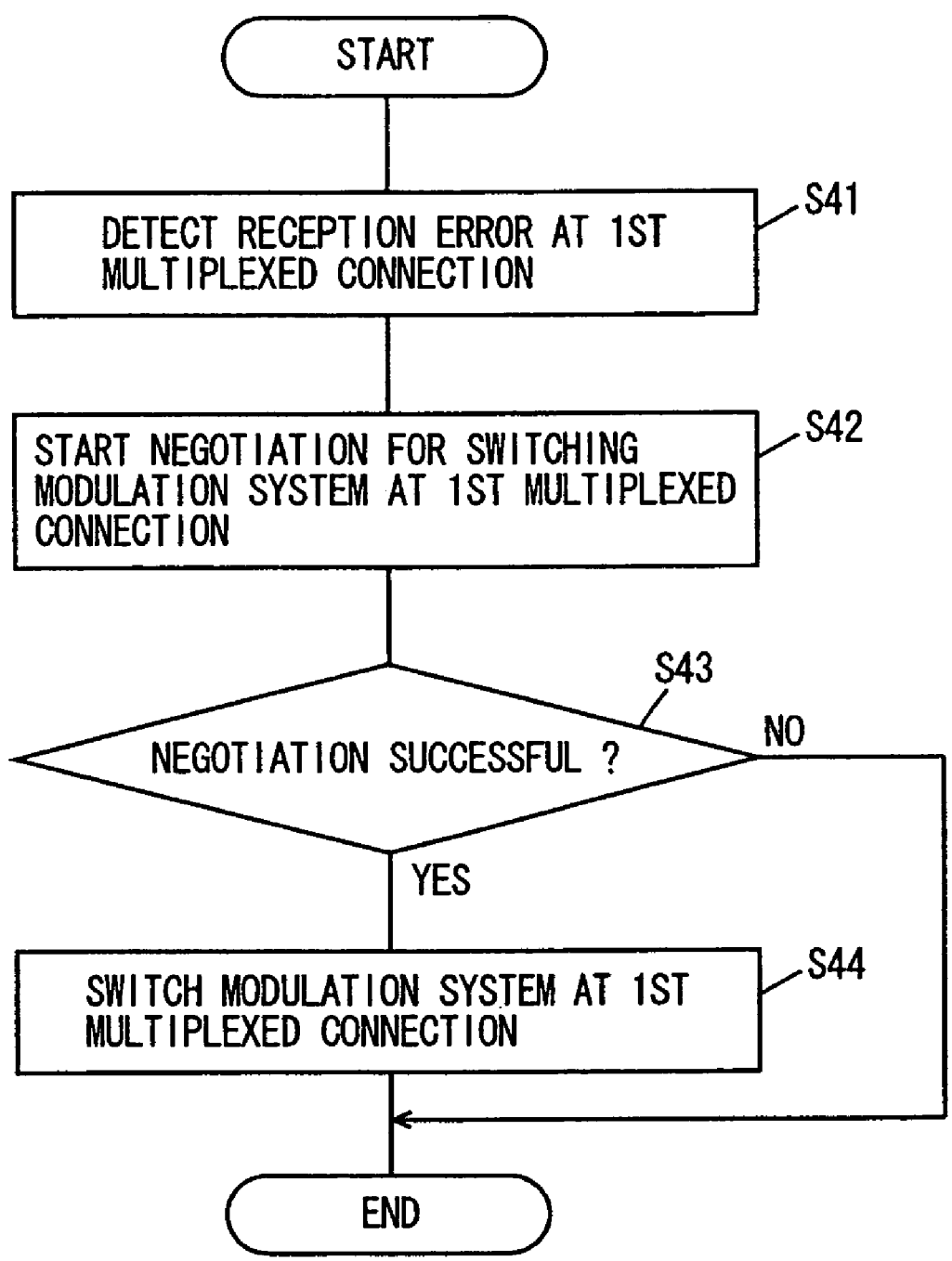
FIG. 7 is a flow chart specifically illustrating a third operation for controlling a spatial path in an embodiment of the present invention.
Figure 8A:
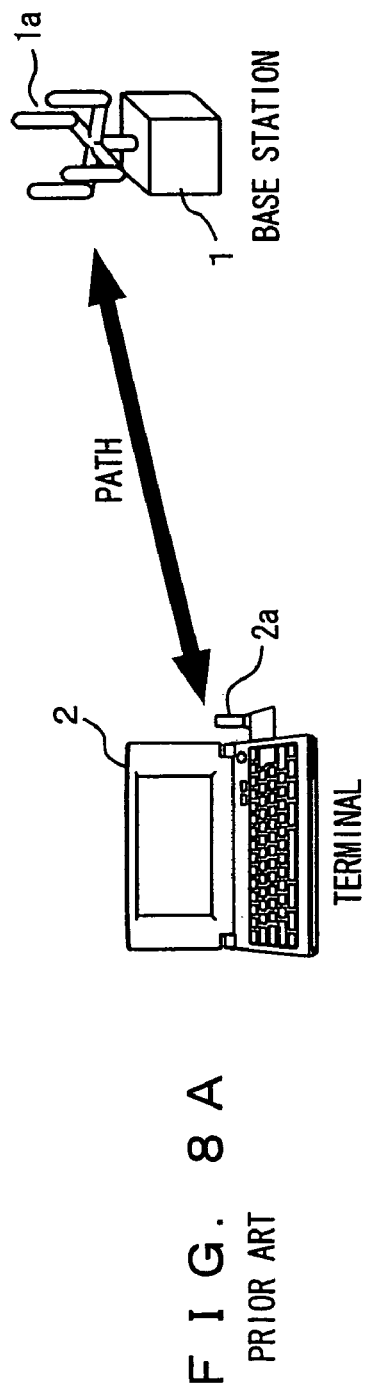
FIGS. 8A and 8B schematically show a concept of a manner of connection in a conventional, one path for one user scheme.
Figure 8B:
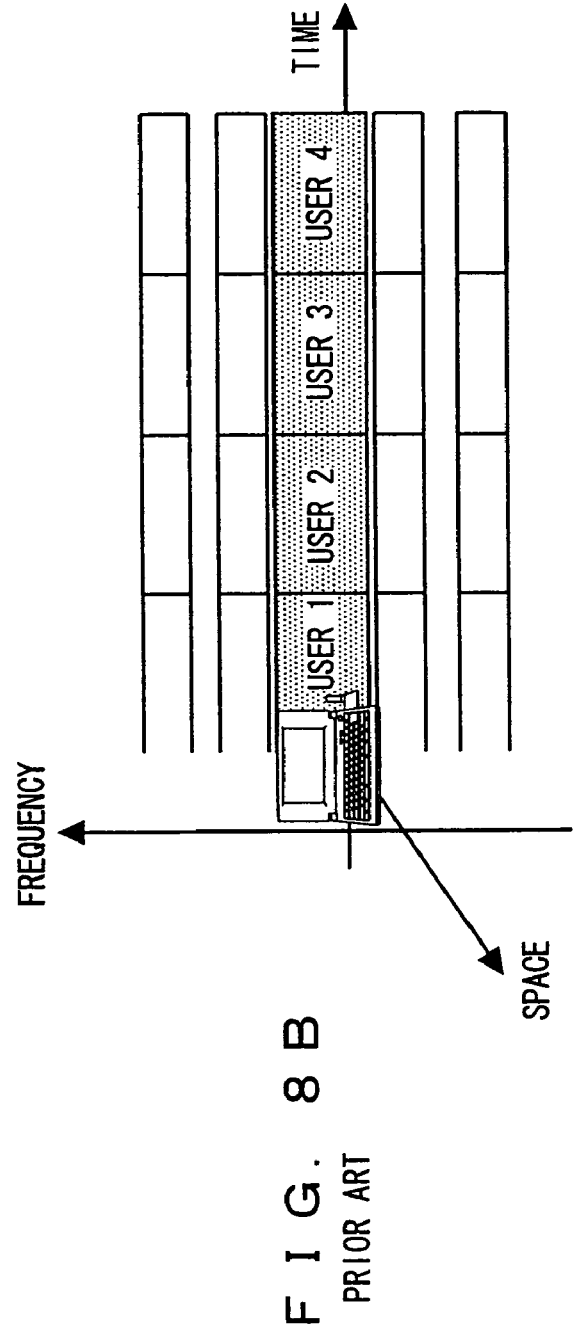
Figure 9A:
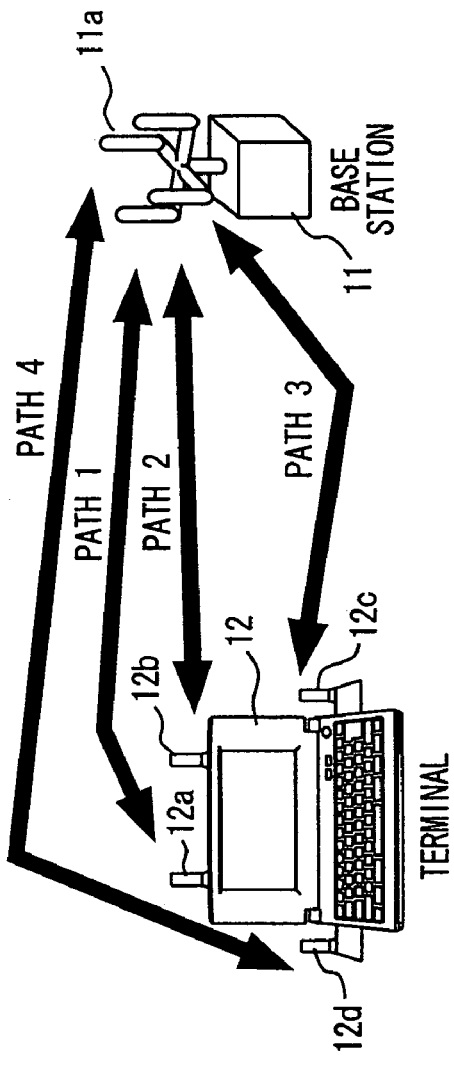
FIGS. 9A and 9B schematically show a concept of a manner of connection in a 4 paths for 1 user scheme by the MIMO system.
Figure 9B:
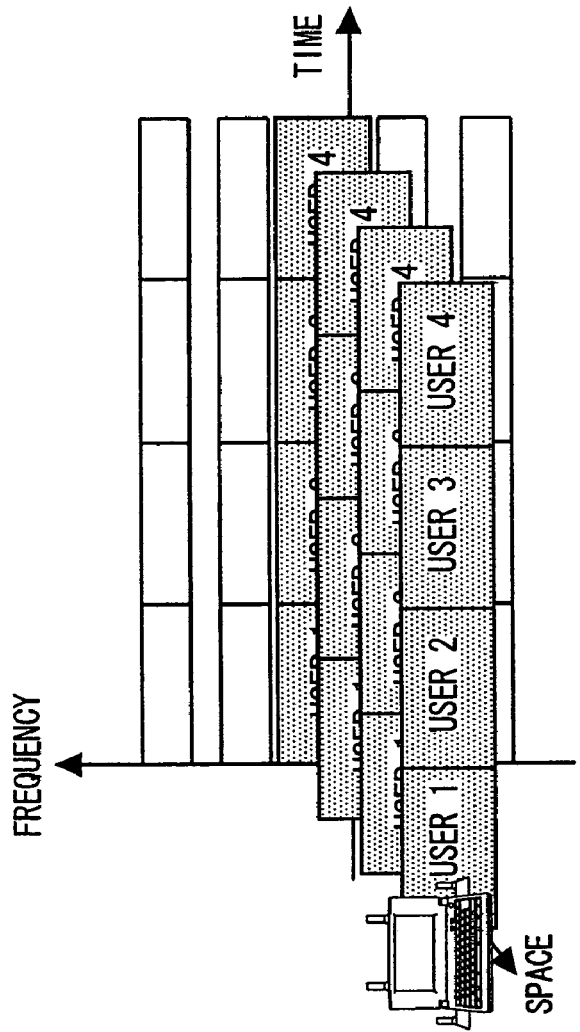

In the FIG. 3 S4 and S8 and the FIG. 4 S15 and S19 the third operation is performed, as will now be described hereinafter more specifically. The FIG. 7 is a flow chart representing the third operation. As has been described previously, in the third operation a modulation system for a spatial path with a reception error is changed to reduce the path's modulation level.

For example, let us assume that between the terminal and the base station the number of multiplexed connections is four and the spatial path of the first multiplexed connection is detected as having a reception error.

In that case, in the FIG. 7 S41 a reception error being introduced in the spatial path of the first multiplexed connection is detected.

In that case S32 is performed and for a downlink reception error detected at the terminal the terminal starts a negotiation with the base station for reducing a modulation level at the first multiplexed connection and for an uplink reception error detected at the base station the base station starts a negotiation with the terminal for reducing a modulation level at the first multiplexed connection.

If a decision is made at S43 that the negotiation has failed, the current operation ends. If a decision is made that the negotiation is successful then S44 is performed to perform an operation to reduce a modulation level at first multiplexed connection.

Reducing a modulation level of a spatial path means changing a modulation and demodulation system adopted at a terminal and a base station. For example, conventional PHS normally adopts a π/4 quadrature phase shift keying (QPSK) system as its modulation and demodulation system.

Recent mobile communication systems are required to provide transmission of higher quality and larger capacity than conventional audio communication, as done in data communication. To do so, applying a modulation and demodulation system of a larger multivalue (or higher modulation level) than the aforementioned, π/4 shift QPSK system, is being considered.

As one example of such a multivalue modulation and demodulation system, applying a well known, 16 quadrature amplitude modulation (QAM) system to PHS is being considered. Such a multivalue modulation demodulation system higher in level for modulation allows a higher communication rate, although it is susceptible to environment of electric wave and prone to reception error.

Accordingly, if a terminal and a base station are radio apparatuses switchable to accommodate both of the π/4 shift QPSK system and the 16 QAM system then for a spatial path detected during communication in the 16 QAM system higher in level for modulation as having a reception error the 16 QAM system is switched to the π/4 shift QPSK system as the latter system is lower in level for modulation and less prone to reception error. While this reduces a rate of communication in the spatial path, it prevents reception error to attempt to maintain communication.

Modulation and demodulation systems in mobile communication systems include not only the aforementioned 16 QAM, π/4 shift QPSK but also BPSK, QPSK, 8PSK and other various systems and the present invention is not limited to 16 QAM or π/4 shift QPSK. It only requires that a spatial path capable of accommodating a plurality of modulation and demodulation systems of different modulation levels be controlled to be changed from a high modulation level to a low modulation level.

Thus in accordance with the present invention in a terminal or base station of a communication system accommodating MIMO a communication operation through a spatial path detected as having a reception error can appropriately be switched and a different operation selected as based on the path's communication quality information. If spatial paths interfere each other, the terminal and the base station can still maintain connection therebetween to maintain communication.

INDUSTRIAL APPLICABILITY

Thus the present radio apparatus, radio communication system, and method of and program for controlling a spatial path is suitable for maintaining connection between a terminal and a base station in an MIMO mobile communication system.

The invention claimed is:

1. A radio apparatus capable of forming a plurality of spatial paths to/from a separate single radio apparatus for communication, comprising:

a reception error detection circuit for detecting a reception error being introduced in said plurality of spatial paths; and an operation select circuit responsive to a number of spatial paths detected as having said reception error and information of communication quality of said path detected as having said reception error to select one of a first operation releasing a plurality of spatial paths detected as having said reception error excluding one spatial path, a second operation transmitting identical information through a plurality of spatial paths detected as having said reception error, and a third operation changing a modulation system of a spatial path detected as having said reception error.

2. The radio apparatus of claim 1, wherein when said reception error is detected in a spatial path capable of accommodating a plurality of modulation systems, said operation select circuit selects said third operation.

3. The radio apparatus of claim 1, wherein when a plurality of spatial paths detected as having said reception error have a reception error rate exceeding a prescribed threshold value, said operation select circuit selects one of said first and second operations.

4. The radio apparatus of claim 1, wherein when a plurality of spatial paths detected as having said reception error have an amount of interference exceeding a prescribed threshold value, said operation select circuit selects one of said first and second operations.

5. The radio apparatus of claim 1, wherein when said operation select circuit selects said first operation, said operation select circuit selects an adaptive array reception operation utilizing said spatial path released.

6. The radio apparatus of claim 1, wherein said radio apparatus is a radio apparatus in a base station of a mobile communication system and said separate single radio apparatus is a radio apparatus in a mobile terminal device of the mobile communication system.

7. The radio apparatus of claim 1, wherein said radio apparatus is a radio apparatus in a mobile terminal device of a mobile communication system and said separate single radio apparatus is a radio apparatus in a base station of the mobile communication system.

8. The radio apparatus of claim 6 or 7, wherein said base station is an adaptive array base station forming said plurality of spatial paths.

9. A method of controlling a spatial path, employed in a radio apparatus capable of forming a plurality of spatial paths to/from a separate single radio apparatus for communication, comprising the steps of:

detecting a reception error being introduced in said plurality of spatial paths; and selecting one of first, second and third operations based on a number of spatial paths detected as having said reception error and information of communication quality of said path detected as having said reception error, said first operation releasing a plurality of spatial paths detected as having said reception error excluding one spatial path, said second operation transmitting identical information through a plurality of spatial paths detected as having said reception error, said third operation changing a modulation system of a spatial path detected as having said reception error.

10. The method of claim 9, wherein when said reception error is detected in a spatial path capable of accommodating a plurality of modulation systems, the step of selecting selects said third operation.

11. The method of claim 9, wherein when a plurality of spatial paths detected as having said reception error have a reception error rate exceeding a prescribed threshold value, the step of selecting selects one of said first and second operations.

12. The method of claim 9, wherein when a plurality of spatial paths detected as having said reception error have an amount of interference exceeding a prescribed threshold value, the step of selecting selects one of said first and second operations.

13. The method of claim 9, wherein when said first operation is selected, the step of selecting selects an adaptive array reception operation utilizing said spatial path released.

14. The method of claim 9, wherein said radio apparatus is a radio apparatus in a base station of a mobile communication system and said separate single radio apparatus is a radio apparatus in a mobile terminal device of the mobile communication system.

15. The method of claim 9, wherein said radio apparatus is a radio apparatus in a mobile terminal device of a mobile communication system and said separate single radio apparatus is a radio apparatus in a base station of the mobile communication system.

16. The method of claim 14 or 15, wherein said base station is an adaptive array base station forming said plurality of spatial paths.

* * * * *